United States Patent

[11] 3,628,259

[72] Inventor Herbert Kahn
 151 Legion Place, Malverne, N.Y. 11565
[21] Appl. No. 828,471
[22] Filed May 28, 1969
[45] Patented Dec. 21, 1971

[54] SELF-EDUCATIONAL DEVICE
 17 Claims, 12 Drawing Figs.
[52] U.S. Cl. .................................................. 35/9 E, 35/75
[51] Int. Cl. .................................................. G09b 3/00
[50] Field of Search .......................................... 35/8, 8.2, 9, 9.2, 35 B, 31 E, 48, 48 A; 281/75, 45

[56] References Cited
UNITED STATES PATENTS

| | | | |
|---|---|---|---|
| 2,486,891 | 11/1949 | Stroh | 35/8 B |
| 2,652,635 | 9/1953 | Conger | 35/9 |
| 2,693,646 | 11/1954 | Hawkins | 35/9 A |
| 3,105,307 | 10/1963 | Cornell | 35/9 B |
| 3,191,315 | 6/1965 | Hannah | 35/9 |
| 3,358,391 | 12/1967 | Warren et al. | 35/35 B |

Primary Examiner—Wm. H. Grieb
Attorney—Arthur T. Groeninger

ABSTRACT: A self-educational device adapted to provide a programmed plan of instruction for teaching bidding in the game of contract bridge, said device being adapted to hold a plurality of cards representing a set to be studied. The device includes means for allowing incremental, selective and progressive exposure and study of data on said cards so as to firstly, incrementally provide a student with text material, secondly, present the student with the problems in an increasing order of complexity, thirdly, selectively present rationale to solutions so as to require restudy in the case of a wrong answer, fourthly, provide immediate self correction without distraction, fifthly, instill a logical approach to problem solution thereby teaching the student to think, sixthly, allow filing of the cards so as to make ready for immediate restudy, and seventhly, automatically provide a grading so that an instructor is able to readily determine which students are most in need of help.

INVENTOR
HERBERT KAHN

BY
ATTORNEY

INVENTOR
HERBERT KAHN
ATTORNEY

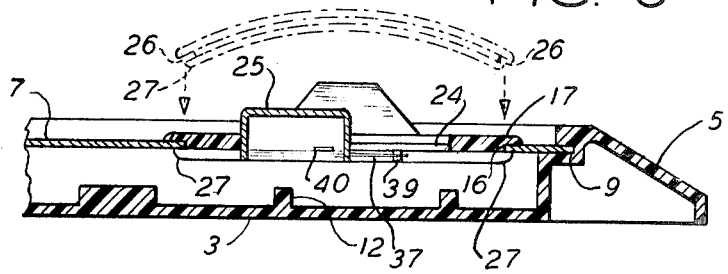
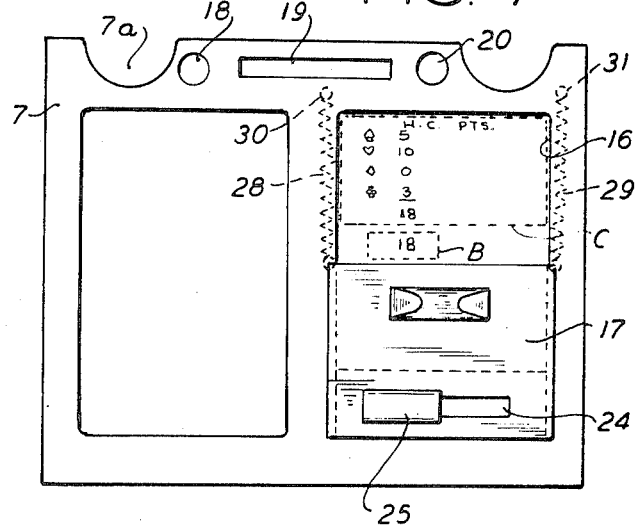
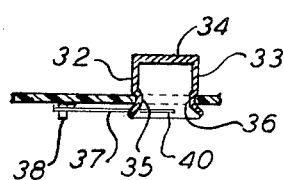
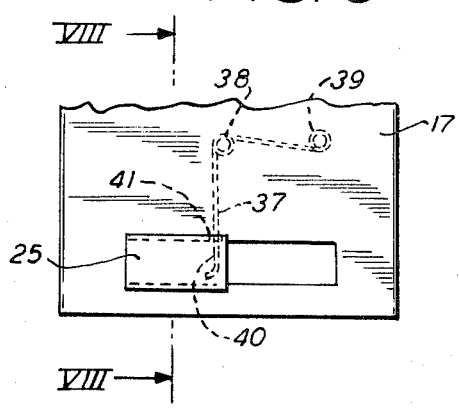
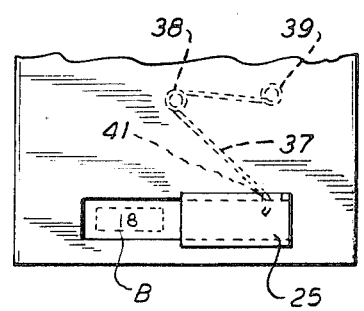
INVENTOR
HERBERT KAHN

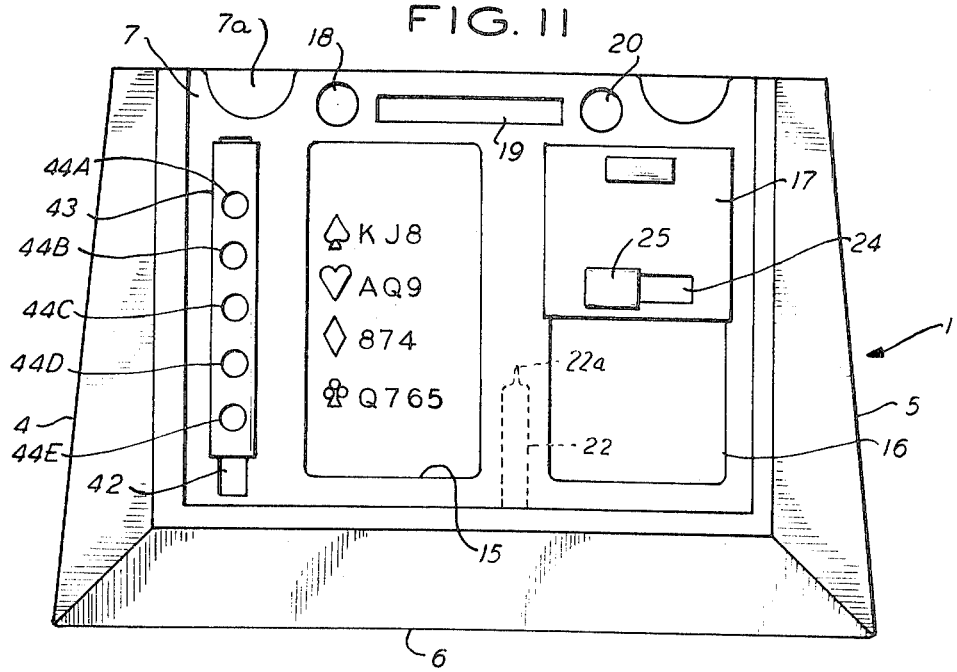
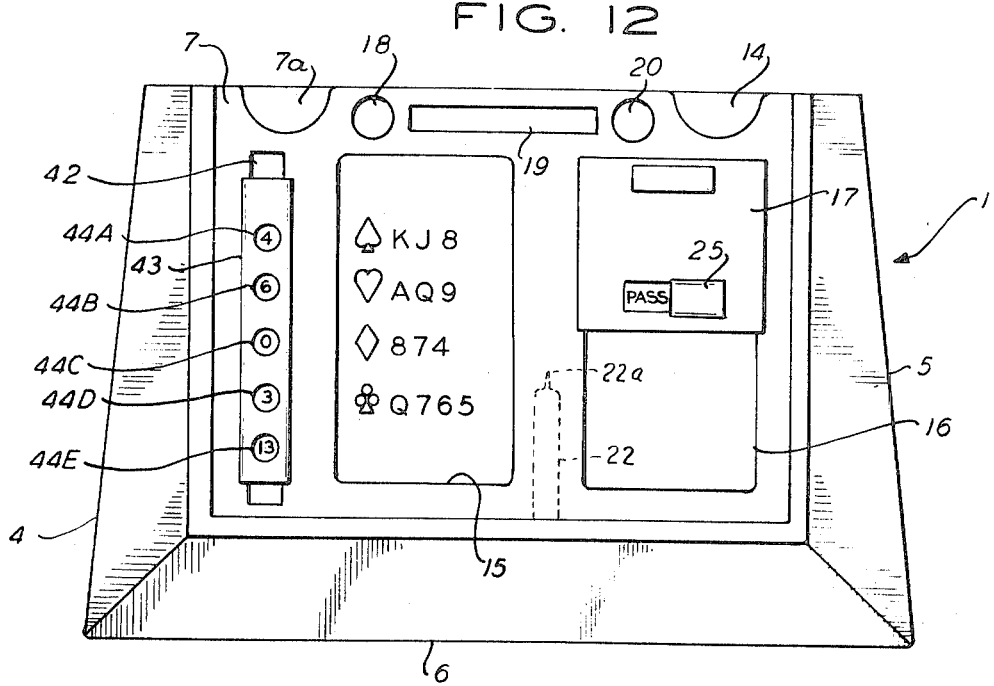

SELF-EDUCATIONAL DEVICE

BACKGROUND OF THE INVENTION

Heretofore, no system has been developed for conveniently and effectively teaching the art and science of bidding in the game of contract bridge by modern programmed learning techniques.

In the past, books and tables have been used to aid a student to learn bidding. Firstly, these methods of haphazard as the material is not set up to enable a student to learn in small steps with each step leading to the next step. Secondly, the material is not set up to enable the student to respond to each increment as the solution is immediately presented to him upon review of the problem. If the answer is not immediately presented, the student goes through the distractful process of looking up the answer usually through a complicated indexing arrangement. Thirdly, none of the advantages of modern programmed techniques are used.

SUMMARY OF THE INVENTION

The present invention comprises a self-educational device for providing a programmed plan of instruction for bidding in the game of contract bridge. The device allows a group of cards to be systematically presented and studied so as to enable a student to learn by gradual increments leading to subject mastery. After study, the solution is readily available for confirming the results of the students study.

The invention includes a casing adapted to hold a stack of cards. The casing has an open end through which the cards are inserted. The casing is apertured so as to expose selected data on the uppermost card in the stack. The uppermost card may be individually removed thereby bringing the next adjacent card to view.

Each of the cards includes several areas containing indicia. A first area of each card contains indicia representing a typical contract bridge bidding problem. A second area of each card contains the answer to the problem. A third area of each card contains the explanation or rationale for the answer. A fourth area contains text or background material, such as vocabulary and the like.

The casing includes a top wall having two openings therein, one of which exposes the area containing the bid problem. The other opening is partially covered by a slidable cover member which, in first position, covers the answer and explanation area of the card, while leaving the text area exposed. In a second position, the cover member exposes both the answer and the rationale areas.

The cover includes an aperture which overlies only the answer portion. This aperture is normally closed by a closure member mounted on the cover which may be removed so as to expose only the answer when such is desired.

The problems presented by the cards increase in complexity as one progresses through a group thereby allowing a student to progress through his study step by step. The device further includes means for exposing a number on each card so as to assure that the group is studied in a progressive order.

In order that a card properly registers in the casing so as to expose the printed matter thereon through the apertures and in order to minimize shifting as the cards are individually removed, each of the cards includes a recessed edge adapted to receive a complimentary locating stud formed within the casing.

In use, the bridge problem is studied and the student determines an answer. The student then displaces the closure member on the cover so as to expose the answer. Assuming his answer is incorrect, he then restudies the problem until the correct answer is determined or he finds that he cannot find the solution. Having done this, he then moves the cover member to confirm to self correct the results of his restudy. The two step exposure, requiring as it does a restudy in case of a wrong answer, is a significant advantage of the present invention.

The answer opening and problem opening in the top wall are adjacent to each other thereby permitting immediate self correction.

The device further includes means for exposing the class of problem being studied. For example, point count problems, unguarded honor problems, constitute classes and these are arranged in an order so as to instill logical thinking.

In a modified embodiment of the present invention, the device includes means for selectively exposing an additional area of the card so as to provide a portion of a solution. For example, a bridge bid requires a determination of point count, how much should be bid, a decision on whether or not to bid and whether the bid should be trump or no trump. In this embodiment, the point count is exposed separate from the other answers thereby further fostering gradual increment study.

DRAWINGS

FIG. 6 is a cross section taken on line 6—6 on FIG. 1 showing the connection of the cover member to the top wall.

FIG. 7 is a plan view showing the cover member displaced from its normal position.

FIG. 8 is a cross section taken on line 8—8 of FIG. 9 showing the connection of the closure member to the cover member.

FIG. 9 is a plan view showing the closure member spring biased to its normal position.

FIG. 10 is a plan view showing the closure member displaced from its normal position.

FIG. 11 is a plan view of a modification of the present invention including an additional means for selectively exposing a portion of an answer.

FIG. 12 is a plan view similar to FIG. 11 showing a portion of the answer selectively exposed.

DETAILED DESCRIPTION

Figure 1:
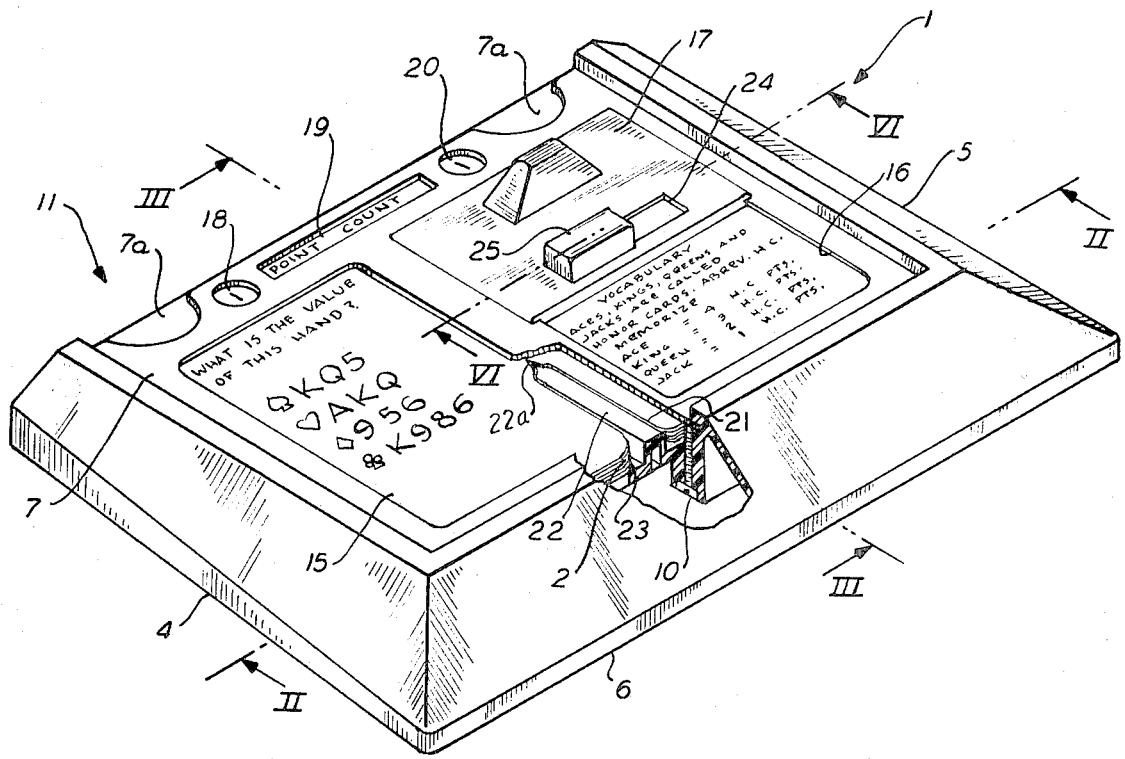
FIG. 1 is a perspective view of the present invention partly broken away to illustrate the alignment means for cards.

In the various figures, parts which are identical bear the same reference numeral.

While the invention is illustrated with particular reference to bridge, it is to be understood that this is done merely to illustrate specific details of the invention. The invention has application to any field of study. For example, it may readily be applied to mathematics or language study.

Figure 2:
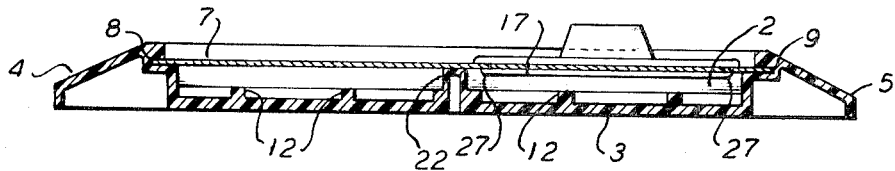
FIG. 2 is a cross section taken on line 2—2 of FIG. 1.

Referring to FIGS. 1 and 2, the present invention is shown as comprising a casing 1 adapted to hold a plurality of cards 2 arranged in a set or stack. The term set will be hereinafter used to describe the stack of cards.

Casing 1 may be constructed from any suitable material including wood, metal, plastic or the like and, preferably, it is made of medium impact styrene. Cards 2 are made from cardboard or the like and are sufficiently rigid so as to self sustain in a plane.

Casing 1 includes a bottom wall 3 integrally formed with sidewalls 4 and 5 and end wall 6. The top of casing 1 is covered by a top plate or wall 7 which may be constructed from any suitable material and preferably is made from metal. Wall 7 is slidably and removably inserted in grooves 8 and 9 in sidewalls 4 and 5. Top wall 7 may optionally be secured in place by a screw or the like 10 extending through the end wall 6 against wall 7.

Casing 1 is open ended at 11 so as to permit a set of cards to be fully inserted therein. As hereinafter more particularly described, each of the cards 2 is printed, or otherwise formed by any conventional means with data on the upper surface thereof with the uppermost card having portions selectively exposed through the top wall 7. After the uppermost card is studied, it is individually grasped through the recess 7A in wall 7 and removed. The next adjacent card is then in view.

Figure 3:
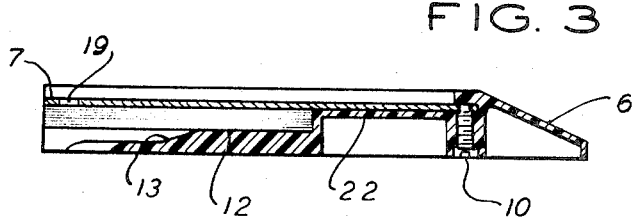
FIG. 3 is a cross section taken on line 3—3 of FIG. 1.
Figure 4:
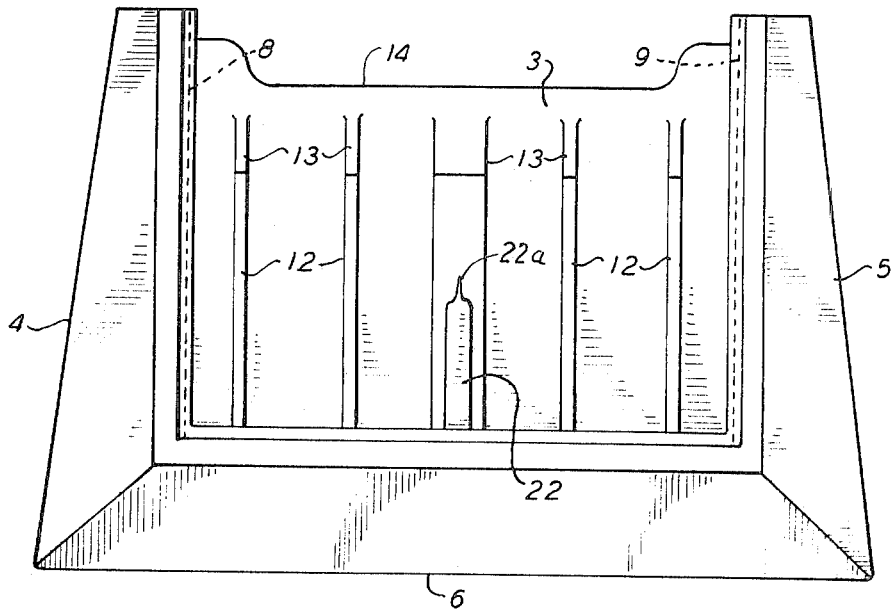
FIG. 4 is a plan view of the present invention with the top wall removed.

The removed card is inserted on the bottom of the set. As shown in FIGS. 3 and 4, ribs 12 upstanding from bottom wall 3, tapers and forms a ramp 13 so as to facilitate the insertion of a removed card. As shown in FIG. 4, the bottom wall 3 is recessed at 14 so as to permit the user to better grasp the card as it is being reinserted.

Figure 5:
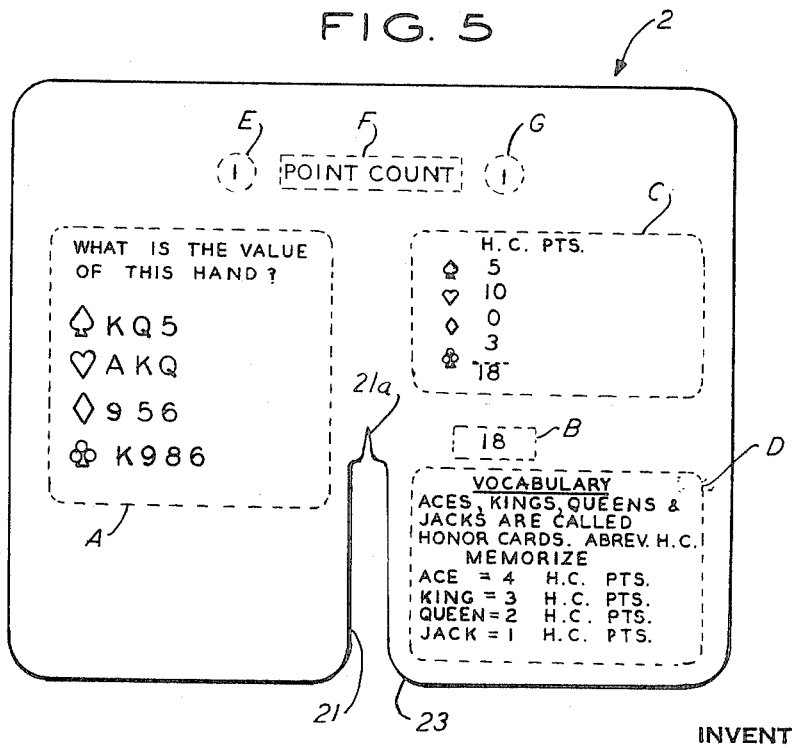
FIG. 5 is a plan view of the card portion of the present invention.

Referring to FIG. 5, a typical card 2 is illustrated. Each of the cards 2 include a first area A having printed thereon a typical 13 card bridge hand together with a question on how such a hand should be bid.

A second area B is provided on card 2 having printed thereon the answer to the problem in area A while a third area C is provided having printed thereon the rationale behind the answer provided in B.

A fourth area D is provided having text material such as vocabulary and other material to be studied to prepare a student for answering the problem in area A. The student is immediately tested on this material by the question on the same card and, in order to assure understanding, the testing will continue on one or more adjacent cards. Selected cards in a set contain text and/or background material and as the student proceeds through the set, the text material increases in complexity.

A fifth area E is provided having printed thereon a number of the particular card in accordance with a prearranged order within the set. A sixth area F is provided having printed thereon the study classification indicating the type of bidding problem under study.

One set of cards will not teach the art and science of bidding. Accordingly, the present invention is adapted to be used in conjunction with several sets of cards. A seventh area G is provided on card 2 for indicating the set number.

In each set, several bidding problems might be presented relating to a more general problem area. For example, the first set to be studied, might generally include problems relating to determining value of a hand. More particularly, it might include 12 cards with cards 1–3 presenting problems relating to point count. Cards 4–6 might present problems relating to unguarded honors together with point count. Cards 6–9 might present problems relating to distribution points together with point count and unguarded honors problems. Cards 10–12 might present problems relating to quick tricks in combination with the prior presented problems.

The cards in the set thus present the study in increments. As the student goes through the stack, the problems gradually increase in complexity with a solid foundation being laid as he proceeds to knowledge and subject mastery.

A second stack of cards might include several bidding problems generally relating to biddable suits in combination with value problems. This separation of general problems into stacks is significant as it not only fosters the step by step process to learning but, just as important, teaches the student to think in a logical manner. For example, he is taught to approach the bidding problem by first determining value and then determining biddable suits. This thinking experience as well as knowledge learned will be used in actual play of the game.

In addition, the grouping of the cards into general problem area is a tremendous convenience for refresher studies in particular problem area if the student feels such is necessary.

The distance between top wall 7 and ribs 12 is sufficient to accommodate a set of cards. As shown in FIG. 1, top wall 7 is provided with an aperture 15 for exposing problem area A of the uppermost card. A second aperture 16, immediately adjacent aperture 15, is provided in top wall 7 and includes a cover member 17 selectively exposing answer area and rationale areas B and C of the uppermost card so as to allow immediate self correction.

Cover member 17 only partially covers aperture 16 and normally covers answer and rationale areas B and C leaving area D exposed so as to allow the student to study his text and background material before attacking a problem.

A third aperture 18 in top wall 7 exposes the number of the card in a particular set. The cards in a set are arranged in numerical order with the higher numbers indicating a higher degree of complexity. This numbering system assures that the student is proceeding in a proper order of presentation. In addition, the numbering system acts as a scoring device. The latter feature is particularly important in classroom study as it enables an instructor to readily determine which student needs individual extra attention.

A fourth aperture 19 in top wall 7 exposes the particular problem area being studied, e.g. point count, unguarded honors, etc. In addition to categorizing the particular problem for the student, the particular problems are arranged in an order to teach a student how to think in solving the general problem of the set under study. Assuming a set relating to the problem of value is studied, the student is taught to solve by first determining point count, then reviewing unguarded honors, etc.

A fifth aperture 20 is provided for exposing the set number. As hereinbefore described, proceeding according to set number, further teaches the student to think and provides a convenient tool for gaining access to a refresher study.

In order to assure that cards 2 are inserted in the correct direction into casing 1 and in order to assure that they are properly located within casing 1 so that the indicia areas are/or can be exposed, each of the cards 2 include a U-shaped recess, as indicated at 21 in FIG. 1, so as to received a complimentary U-shaped locating stud 22 integrally formed in casing 1. The locating stud 22 not only properly locates the set inserted in the casing, but also minimizes shift as the top card is being removed thereby assuring that the adjacent card is properly aligned with the apertures. Recess 21 is rounded off at 23 so as to self align on stud 22. Stud 22 includes a pointed projection 22A adapted to be received in complimentary recess 21A on card 2 so as to further assure proper location and is especially useful after the cards have been repeatedly used and the sides of U-shaped recess 21 wear down.

As hereinbefore described, answer and rationale areas B and C of the top card 2 in a set is normally covered by cover member 17, slidably mounted in aperture 16. Cover member 17 however includes an aperture 24 which overlies area B of the top card 2. A closure member 25, slidably mounted in aperture 24 normally covers area B. While cover member 17 and closure 25 are shown slidably mounted, it is to be understood that the same may be pivoted to an open position to removably or displacably mounted by any other conventional means.

Referring to FIG. 6, cover member 17 is formed of flexible plastic material having U-shaped grooves 26 formed along portions of its opposite edges. As shown in broken lines, cover member 17 is adapted to be flexed and inserted in aperture 16. Member 17 includes rounded edges 27 to assist in inserting the same over the opposite edges of aperture 16.

As shown in FIG. 7, springs 28 and 29 anchored to top wall 7 at 30 and 31, are connected to cover member 17 so as to retract the same after it has been pulled down to expose the answer and rationale areas B and C.

Referring to FIGS. 8, 9, and 10, closure member 25, mounted on cover member 17 is comprised of an inverted U-shaped member having a pair of flexible leg members 32 and 33, freely extending from bight portion 34, and biased outwardly so that recesses 35 and 36 releasably and slidably engage the opposite edges of aperture 24. As shown in FIGS. 9 and 10, a wire spring 37 mounted on pin 38 is anchored to the cover member 17 at 39. The free end 40 of spring 37 extends through an aperture 41 in leg 32 and is adapted to return the closure member 25 to its FIG. 9 position overlying area B after the answer has been reviewed.

OPERATION

In use, a set of cards 2, are placed in casing 1 with proper alignment being assured by recesses 21 of each card snugly engaging locating stud 22. Areas A, B, C, D, E, F, and G of each card 2 are aligned when the cards are in a set. The top card is preferably an introduction to the group of cards and covers the answer to the first cards to be studied as the group is inserted.

After the introductory card is removed, area A of the top card containing the problem is exposed through aperture 15 as shown in FIG. 1. Areas B and C having the answer and rationale, are aligned with aperture 16 and are covered by cover 17. Area D containing text material is exposed through the uncovered portion of aperture 16.

The student reviews the card number which is exposed through aperture 18. He determines the set number exposed through aperture 20 to make certain that the group of cards being studied are in line with his program of study. The class of problem, exposed through aperture 19, is then reviewed so as to obtain a general idea of the problem area to be studied.

The student then studies the text material exposed in area D. After this study, he reviews the problem and arrives at the answer. The student moves the closure member 25 on the cover 17 to the position shown in FIG. 10 so as to expose the answer in area B. Assuming the answer is wrong, he again restudies the problem until he arrives at the correct answer or finds he is stymied. He then pulls cover member 17 to the position shown in FIG. 7 so as to expose the rationale in area C thereby confirming his solution or providing immediate self correction.

After the top card has been studied, it is individually removed and placed on the bottom of the stack. The locating stud 22 allows removal of the top card with minimal shift in the set thereby maintaining the alignment. During reinsertion, the card rides ramp portion 13 of the bottom walls ribs 12 until it engages under the stack. It is then fully inserted with recess 14 in bottom wall 3 allowing a good grasp during reinsertion. Cards 2 are sufficiently rigid so as not to flex during reinsertion.

The next card will then have area A exposed and the process is repeated. This card may or may not contain text material but may be used merely to further test the particular class of problem under study.

The answer portion being readily and conveniently located allows the student to obtain immediate self correction. Each student may set his own pace. In classroom use, each student may proceed as fast as possible without being exposed to boring reemphasis for the benefit of slow students.

As the student progresses through the stack, the number of the card through aperture 18 gives him an indication of his progress. As hereinbefore described, this can also be used by an instructor to determine which students need individual attention.

If the first stack relates to value, the student on completing the stack will have been exposed to the required text and self tested to assure knowledge. In addition, he will be exposed to an order of presentation which will teach him to think.

PARTIAL ANSWER MODIFICATION

Learning point count is a rather simple process as it requires a mere association of points with particular cards and a summation of these points. Yet, it is the first step in determining whether or not to bid.

The full answer in bridge bidding requires a further determination as to whether the student should bid or pass, with or without trump, with the given point count.

Since the latter requires additional reasoning, it is well to provide answers to two problems separately so that the student on solving one of these problems is not exposed to the solution to the other. This again enhances incremental study.

Referring to FIGS. 11 and 12, a further modification of the present invention is shown wherein an additional elongated aperture 42 is provided. Aperture 42 is provided in the top wall 7 and is adapted to receive a slidable cover member 43. Cover member 43 is slidably mounted in the same manner as closure member 25, hereinbefore described.

Cover member 43 is provided with a plurality of apertures 44 normally revealing blank portions of card 2. When cover member 43 is moved to the position shown in FIG. 12, the point count of spades, hearts, clubs and diamonds of the card hand under study are revealed respectively in apertures 44A, 44B, 44C, and 44D. The total sum of the cards is provided in aperture 44E.

In us, the student studies the bridge hand exposed through aperture 15. He then confirms the point count by moving cover member 43 to the position shown in FIG. 12 so as to reveal the correct values through apertures 44. He then further makes study to determine whether to bid or pass, trump or no trump. The answer to this can be confirmed by moving closure member 25, as hereinbefore described. Finally, he confirms or self-corrects his reasoning by moving cover member 17 downwardly to expose the answer rationale.

The modification in FIGS. 11 and 12 are identical to the modification in FIG. 1 except that the cards and casing have been made larger to accommodate exposure through aperture 42. In this embodiment, the locating stud is placed as in FIG. 1 and accordingly, one can use cards as illustrated in FIG. 5 as well as enlarged cards particularly suited for this specific modification.

The foregoing is considered illustrative only of the principles of the invention. Since numerous modifications and changes will readily occur to those skilled in the art, it is not desired to limit the invention to the exact construction and operation shown and described, and accordingly all suitable modifications and equivalents may be resorted to as falls within the scope of the invention.

What is claimed is:

1. The combination comprising a casing, a plurality of cards in said casing, each of said cards being sufficiently rigid so as to self sustain in a plane, said casing having a first and second apertures therein, each of said cards including first areas aligned with said first aperture and second areas aligned with said second aperture, each of said cards having indicia providing an interrogatory in said first area, each of said cards having indicia providing the answer to said interrogatory in said second area, each of said cards having indicia representing the rationale for said answer in said third area thereof, one of said apertures normally exposing the first area of the top card of said plurality of cards, the other of said apertures including a cover member normally covering said second area on said top card, means for (1) displacably mounting said cover so as to expose said answer while concealing said rationale, and (2) for exposing both said answer and said rationale, and means for allowing individual and successive removal of the top card of said plurality of cards and reinsertion thereof as a bottom card to said plurality of cards to maintain said plurality of cards in a predetermined order so as to incrementally present a student with interrogatories of increasing complexity as he proceeds to subject mastery.

2. The combination as defined by claim 1, each of the cards including a third area aligned with and normally exposed through said other of said apertures, selected ones of said cards having text material in said third area to provide background in answering the interrogatory presented on subsequent cards whereby text material is incrementally presented with intermediate testing on the text increments.

3. The combination as defined by claim 1, said pair of apertures being located in the top well of said casing, said apertures being adjacent so as to provide immediate self correction, said top wall being recessed thereby providing a slot for individually grasping the top card for removal purposes.

4. The combination as defined by claim 1, each of said cards including indicia indicating the order of said cards in said predetermined order, said casing including an aperture for exposing said last-mentioned indicia whereby an instructor is made immediately aware of a student's progress relative to other students.

5. The combination as defined by claim 1, said plurality of cards being arranged in a stack with interrogatories relating to a general problem area, each of said cards including indicia indicating a particular problem area of the more general problem area, said plurality of cards being arranged in an order so that the particular problems are presented in a logical order thereby teaching the student how to think in solving the general problem.

6. The combination as defined by claim 1, each of said cards including a recess, said casing including locating means cooperating with said recess for assuring alignment of said interrogatories and said answers with said aperture and for minimizing shift of said plurality of cards as the top card is removed.

7. The combination as defined by claim 1, means including a reentry slot for allowing reinsertion of a removed card to the bottom of said plurality of cards, said cards being sufficiently rigid so as not to flex on reinsertion.

8. The combination as defined by claim 7, means for maintaining said plurality of cards in a raised position relative to said reentry slot.

9. The combination as defined by claim 8, ramp means for guiding a reinserted card to the bottom of said plurality of cards.

10. The combination comprising a casing, a card in said casing, said card having indicia providing an interrogatory in a first area thereof, said card having indicia providing an answer to said interrogatory in a second area thereof, said card having indicia representing the rationale for said answer in a third area thereof, said casing including means for exposing said interrogatory, said casing including further means for (1) selectively exposing said answer while concealing said rationale so as to allow a student to restudy a problem answered incorrectly, and (2) for exposing both said answer and said rationale, said further means includes aperture means in said casing aligned with said second and third areas, cover means for said aperture means.

11. The combination as defined by claim 10, said cover means including an aperture, at least a portion of said second area being aligned with said last-mentioned aperture.

12. The combination as defined by claim 10, said cover means including first and second cover members, said first cover member covering at least a portion of said third area and said second cover member covering at least a portion of said second area.

13. The combination as defined by claim 12, said second cover member being displacably mounted on said first cover member.

14. An article comprising a self educational card, said card including a first, second and third areas, said first area containing indicia representing an interrogatory, said second area containing indicia representing the answer to said interrogatory; said third area containing indicia representing the rationale behind said answer, said card including an edge having a U-shaped recess adapted to cooperate with a locating stud so as to assure exposure of said indicia bearing areas, the midportion of said edge having a second recess in the trough of said U-shaped recess which terminates in a point to further assure exposure; said card being sufficiently rigid so as to self sustain in a plane, a plurality of cards identical to self-instruction card and arranged in a stack therewith, corresponding indicia bearing areas and the recess in said cards being aligned, said cards being arranged in an order so that the interrogatories on said cards increase in complexity.

15. The combination as defined by claim 14, selected ones of said cards including a fourth area bearing background data for the interrogatories on said card and on subsequent cards following said order.

16. The combination as defined by claim 14, each of the cards in said stack including interrogatories relating to a general problem area, said cards including fourth areas bearing indicia representing particular problem areas within said general problem area, said particular problems being arranged in an order in said stack so as to teach a student to think in a logical fashion in solving said general problem.

17. The combination as defined by claim 14, each of said cards including a fourth area indicating its proper location within said stack so as to self grade the progress of a student.

* * * * *